April 11, 1950     J. H. EAGLE ET AL     2,503,714
FILTER HOLDER FOR PROJECTORS
Filed Dec. 8, 1948
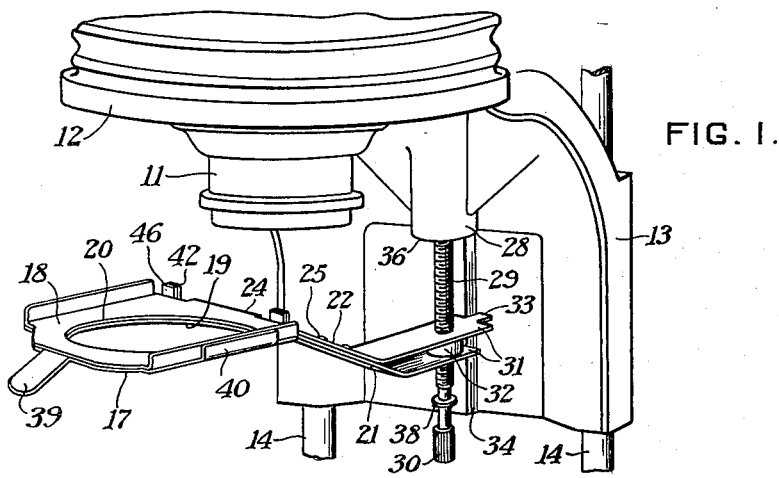
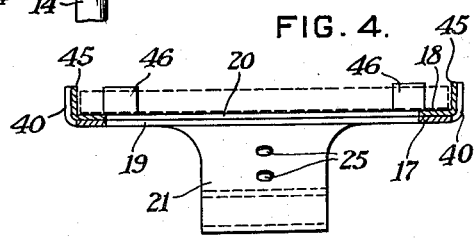
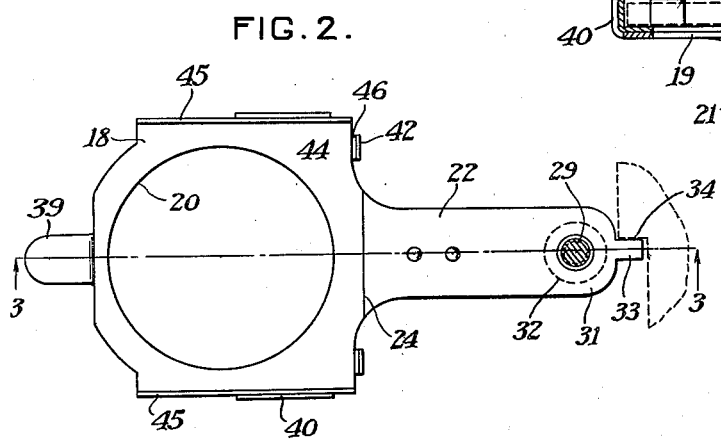
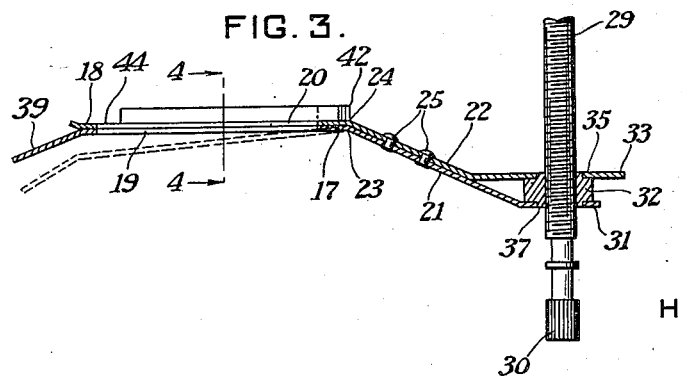
JOHN H. EAGLE
HOWARD P. CAUDLE
              INVENTORS
BY
              ATTORNEYS Patented Apr. 11, 1950

2,503,714

UNITED STATES PATENT OFFICE 2,503,714

FILTER HOLDER FOR PROJECTORS

John H. Eagle and Howard P. Caudle, Rochester, N. Y., assignors to Eastman Kodak Company, Rochester, N. Y., a corporation of New Jersey Application December 8, 1948, Serial No. 64,162

15 Claims. (Cl. 88—24)

The present invention relates to a projection apparatus, and more particularly to a filter holder for use in connection therewith.

As is well known, various light filters or light-varying members are often used in connection with enlarging or projecting apparatus to vary the color or the intensity of the light beam projected by the projection lens. These filters or members are usually positioned below the projection lens, and are sometimes mounted so that they may be moved selectively into and out of the light path through the projection lens so that either a filtered or unfiltered beam may be used as the case requires. When the filter is swung into the light path, it is desirable to provide means for limiting the swinging movement to position the filter accurately in the light beam, the advantages of which are readily apparent to those in the art.

It is often desirable to provide interchangeable lenses on the projector so that different types of lenses may be used to secure different results. With such a variety of lenses, it is found that the length of the lens barrel or mount varies. As is well known, it is desirable to place a filter as close to the lens as possible. Therefore, with such varying lengths of lens mounts, it is necessary to provide means for axially adjusting the holder relative to the lens to position the filter in proper relation thereto. Two general types of filters are usually used. The first type is in the form of a thin, flat gelatin filter, while the second is in the form of a glass-mounted filter or filter mounted in a metal frame; the latter being broadly designated as a mounted filter. Obviously, it is desirable to provide a filter holder which is adapted to receive and position either type of filter or both types simultaneously if such a combination of filters is found necessary or desirable.

The present invention has as its principal object, a simple and novel filter holder which is so mounted on the projector to provide two separate movements; one laterally into and out of the light path through the lens, and a second movement along the lens axis to position the filter relative to the lens.

A further object of the invention is the provision of a novel mount for the holder.

A still further object of the invention is the provision of a filter holder designed to receive either a flat gelatin filter or a mounted filter, or both.

Yet another object of the invention is the provision of means to position such filters accurately and easily on the holder.

Another object of the invention is the provision of a filter mount or holder which is simple in construction, inexpensive to manufacture, comprising few parts of rugged construction, easy to adjust and highly effective in use.

To these and other ends, the invention resides in certain improvements and combinations of parts, all as will be hereinafter more fully described; the novel features being pointed out in the claims at the end of the specification.

In the drawings:

Fig. 1 is a partial view of a projection apparatus, showing the relation thereto of a filter holder constructed in accordance with the present invention;

Fig. 2 is a plan view of the filter holder illustrated in Fig. 1, showing the relation of the various parts of the holder;

Fig. 3 is a vertical sectional view through the holder illustrated in Fig. 2 taken substantially on line 3—3 thereof, showing the filter holder plates with the holder in partially open position; and Fig. 4 is a front view of the holder illustrated in Fig. 2.

Similar reference numerals throughout the various views indicate the same parts.

The holder of the present invention is adapted for use with a wide range of projector designs. In the present embodiment, the filter is shown for use with a projector having a projection lens 11 carried by a mount 12 formed with a depending bracket 13 slidably engaging a pair of spaced rods 14 along which the bracket 13 may be moved to position the lens 11 relative to the paper easel, not shown. The particular projector shown is merely illustrative of one type with which the holder of the present invention may be used, and is not intended as a limitation. As such a projector may be standard design, the remaining parts are not illustrated because they form no part of the present invention and are not necessary for a full and complete understanding of the invention.

The holder of the present invention is formed from two thin strips of sheet material, preferably sheet metal, to provide two rectangular portions 17 and 18 arranged in overlying relation and formed with registering apertures 19 and 20 respectively, of any suitable shape, in the present instance circular. The portions 17 and 18 have connected thereto shanks 21 and 22 connected to the portions 17 and 18 at the bend line 23 and 24, as best shown in Fig. 3. The shanks 21 and 22 are also arranged in overlying relation, as illustrated in Fig. 3, and are held in connected relation by rivets 25. The latter serve to hold the portions 17 and 18 yieldably in contacting relation and to provide a hinge for moving the portions relatively, as indicated in dotted lines in Fig. 3, to permit the opening of the holder for the insertion of a filter, as will be later more fully described.

A boss 28 formed on the bracket 13 has depending therefrom a threaded rod 29 which has its upper end anchored in the boss and the lower end formed with a thumb nut 30 by which the rod 29 may be rotated, as is apparent. The free ends of the shanks 21 and 22 are spread, as shown in 31, to receive a nut 32 which threadedly engages the rod 29, as is apparent from an inspection of Figs. 1 and 3. It will now be apparent from an inspection of Fig. 3 that the nut 32 and rod 29 provide a swivel connection which permits the holder to be swung laterally or beneath the lens 11 to move the filter-receiving portions 17 and 18 into and out of the light path through the lens 11. When, however, the filter is swung into position directly below the lens, the lug 33 on the free end of the upper shank 22 will come into engagement with a vertical ridge or shoulder 34 on the bracket 13 to arrest further swinging movement of the holder and position the filter-receiving portions 17 and 18 directly below the lens 11 and into the light path passing therethrough.

It will also be apparent that upon turning the thumb nut 30, the nut 32 will move axially along the threaded rod 29. As the nut 32 is connected to the free ends of the shanks 21 and 22, such axial movement will shift the filter holder as a unit therewith to position the holder along the axis of the lens. Thus, this rod-and-nut connection 29 and 32 permits axial adjustment of the holder, and also provides a suitable bearing surface for the holder on the rod, as is apparent from an inspection of Fig. 3. Upward movement of the holder is limited by the engagement of the surface 35 of the upper shank 22 with the undersurface 36 of the boss 28. Downward movement of the holder, on the other hand, is limited by the engagement of the undersurface 37 on the nut 32 or the adjacent portions of the shank 21 with a collar 38 on the rod 29, see Fig. 3. Thus, the rod-and-nut connection permits dual movement of the holder. These movements may be made separately or simultaneously, as desired.

When using thin, flat gelatin filters, such filters are placed between the yieldably contacting portions 17 and 18 and are clamped firmly in place therebetween. In order to place such a filter securely between the portions 17 and 18, the latter must be spread or separated to open the holder. To secure this result, the outer end of the lower portion 17 is formed with a downturn tab 39 which may be grasped by the operator and pressed downwardly. Such movement will cause the lower portion to first move about the bend line 23 and finally to flex about the rivets 25 which serve to connect the portions 17 and 18 hingedly and to yieldably urge the portion 17 towards the portion 18. The flat gelatin filter is then positioned between the separated portions. In order that the filter may be properly inserted and positioned to cover the apertures 19 and 20, the lower portion 17 is formed with filter-positioning means. In the preferred embodiment, such position means comprises turned-up flanges 40 on the sides of the portion 17 to engage the side edges of a filter to guide the latter. When the filter reaches its adjusted position, the leading or inner edge of the filter finally engages a pair of up-turned ears 42 projecting upwardly from the rear edge of the portion 17. Thus, the flanges 40 and the ears 42 cooperate to guide and position the filter between the portions 17 and 18. When the filter is positioned, the tab 39 is released and the portion 17 moves upwardly to cooperate with the upper portion 18 to yieldably clamp the filter therebetween.

Instead of a thin, flat gelatin filter, it may be desirable to use a glass-mounted filter or a filter mounted in a metal base. Such a filter is commonly designated as a mounted filter. While such a thin gelatin filter and a mounted filter are not ordinarily used at the same time, the design of the present holder permits such dual use if desired. Such a mounted filter is indicated in dotted lines in Fig. 4 and may be positioned on the upper surface 44 of the upper portion 18, as best shown in Fig. 4. In order to retain the mounted filter in position when covering the aperture 20, the upper portion 18 is provided with filter mount-positioning means which comprises a pair of flanges 45 and ears 46 extending upwardly from the sides and back edges of the portion 18. The flanges 45 and ears 46 are positioned inside and in nesting relation with the flanges 40 and ears 42 of the lower portion 17, as shown in Figs. 2 and 4.

The present invention thus provides a filter holder adapted for use with either a flat gelatin filter or a mounted filter or both. This filter holder is also adapted for use with a wide range of projection apparatus and also the holder has two degrees of movement; namely, a lateral swinging movement into and out of the light path through the projection lens, and a vertical movement along the axis of the lens to position the holder relative to the projection lens. These two movements may be made separately or simultaneously, as desired. The holder construction is simple, easy to operate, and is highly effective in use.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

We claim:

1. In a projection apparatus, the combination with a support, a lens mount adjustably mounted on said support and carrying a projection lens, of a filter holder positionable below said lens, said holder comprising a pair of plates having aligned apertures and adapted to receive a light filter, means on said holder for positioning said filter relative to said apertures, a threaded rod depending from said mount, means for mounting said holder directly on said rod for swinging movement relative thereto into and out of the light path through said lens, and means for rotating said rod to move said holder therealong and relative to said mount to position said holder relative to said lens.

2. In a projection apparatus, the combination with a support, a lens mount adjustably mounted on said support and carrying a projection lens, of a filter holder positionable below said lens, said holder comprising a pair of spring-pressed plates formed with registering apertures, means for hingedly connecting said plates to permit the separation thereof so as to receive a filter therebetween, means for positioning said filter relative to said apertures, means for mounting said holder for swinging movement into and out of the light path through said lens, and means for adjusting said holder relative to said mount to position said holder along the axis of said lens.

3. In a projection apparatus, the combination with a support, a lens mount adjustably mounted on said support and carrying a projection lens, of a filter holder positionable below said lens, said holder comprising a pair of spring-pressed plates formed with registering apertures, means for hingedly connecting said plates to permit the separation thereof so as to receive a filter therebetween, means on one of said plates for positioning said filter detachably relative to said apertures, and means carried by said mount both for supporting said holder for swinging movement into and out of the light path through said lens and for adjusting said holder along the lens axis and relative to said mount to position said holder relative to said lens.

4. In a projection apparatus, the combination with a support, a lens mount adjustably mounted on said support and carrying a projection lens, of a filter holder positionable below said lens, said holder comprising a pair of overlying plate members, a threaded rod secured to and depending from said mount, means for securing one end of said plates to said rod to permit said holder to be swung laterally into and out of the light path through said lens, means for rotating said rod to move said holder along the axis of said lens to position said holder relative thereto, means for connecting the plates between the ends thereof to afford a hinge by which the other ends of the plates may be moved to separate said other ends to position a filter therebetween, said other ends being formed with registering apertures, means on at least one of said plates for positioning said filter in alignment with said apertures, and means for moving said other ends relatively to open said holder.

5. In a projection apparatus, the combination with a support, a lens mount adjustably mounted on said support and carrying a projection lens, of a filter holder positionable below said lens, said holder comprising an upper and a lower plate, a threaded rod secured to said mount and depending therefrom, means for mounting one end of said plates on said rod for unitary swinging movement into and out of the light path through said lens, means for rotating said rod to move said holder axially of and relative to said lens, means for connecting said plate intermediate the ends thereof to provide a hinge connection by which the other ends of the plates may be moved to separate said other ends to open said holder to position a thin filter between said plates, means on the lower plate for positioning said filter thereon, said hinge serving to hold said plates yieldably in clamping relation with said filter between said plates, said other ends being formed with registering apertures arranged in alignment with said filter, means on the upper plate for positioning and retaining a mounted filter in alignment with said apertures, and a finger tab formed on said other end of said lower plate for moving said other ends relatively to open said holder.

6. In a projection apparatus, the combination with a support, a lens mount adjustably mounted on said support and carrying a projection lens, of a filter holder positionable below said lens, said holder comprising an upper and a lower plate, a threaded rod secured to said mount and depending therefrom, means for mounting one end of said plates on said rod for unitary swinging movement into and out of the light path through said lens, means for rotating said rod to move said holder axially of and relative to said lens, means for connecting said plates intermediate the ends thereof to provide a hinge connection by which the other ends of the plates may be moved to separate said other ends to open said holder to position a thin filter between said plates, means on the lower plate for positioning said filter thereon, said hinge serving to hold said plates yieldably in clamping relation with said filter between said plates, said other ends being formed with registering apertures arranged in alignment with said filter, means on the upper plate for positioning and retaining a mounted filter in alignment with said apertures, a finger tab formed on said other end of said lower plate for moving said other ends relatively to open said holder, a shoulder formed on said mount, and a laterally projecting lug on said holder adjacent said one end adapted to engage said shoulder when said holder is moved into said path to limit the swinging movement of and to position said holder in said path.

7. In a projection apparatus, the combination with a support, a lens mount adjustably mounted on said support and carrying a projection lens, of a filter holder positionable below said lens, said holder comprising a pair of thin plates, rivets connecting said plates intermediate their ends, one end of said plates being spread apart, a nut carried by said spread ends, the other ends of said plates being enlarged and formed with resistering apertures, said rivets providing a hinge by which said other ends may be separated to permit a filter to be positioned therebetween and in registry with said apertures, said rivets also serving to press said other ends yieldably together to clamp said filter therebetween, marginal flanges formed on the under plate adjacent the aperture therein to engage edges of said filter to position the latter relative to said apertures, a threaded rod secured to and depending from said mount and supporting said nut, said nut and rod affording a threaded connection by which said holder may be swung laterally into and out of the light path through said lens, means for rotating said rod to cause said nut to move axially therealong to adjust said holder along the axis of said lens, marginal flanges formed on the other end of said upper plate adjacent the aperture therein to position a mounted filter on said upper plate, and a finger tab formed on said other end of said lower plate to permit the latter to be moved relatively to said upper plate and about the rivet hinge to separate said plates to permit a thin filter to be placed between said plates.

8. A filter holder for attachment to a projection apparatus having a projection lens, said holder having a portion thereof adapted to be moved laterally into and out of the light path through said lens and also along the axis of said lens and comprising a pair of overlying flat plate members formed with registering apertures at said portions, shank sections connected to said portions, means for connecting said sections to hold said portions together yieldably and to provide a hinge by which said portions may be separated to permit the placing of a filter therebetween, and means on the free ends of said shanks for mounting said holder on said projector for lateral movement into and out of said path and along said axis.

9. A filter holder for attachment to a projection apparatus having a projection lens, said holder having a portion thereof adapted to be moved laterally into and out of the light path through said lens and also along the axis of said lens and comprising a pair of overlying flat plate members formed with registering apertures at said portions, shank sections connected to said portions, means for connecting said sections to hold said portions together yieldably and to provide a hinge by which said portions may be separated to permit the placing of a filter therebetween, means on the free ends of said shanks for mounting said holder on said projector for lateral movement into and out of said path and along said axis, and means for positioning said filter between said portions and in registry with said apertures.

10. A filter holder for attachment to a projection apparatus having a projection lens, said holder having a portion thereof adapted to be moved laterally into and out of the light path through said lens and also along the axis of said lens and comprising a pair of overlying flat plate members formed with registering apertures as said portions, shank sections connected to said portions, means for connecting said sections to hold said portions together yieldably and to provide a hinge by which said portions may be separated to permit the placing of a filter therebetween, means on the free ends of said shanks for mounting said holder on said projector for lateral movement into and out of said path and along said axis, and means for separating said portions to permit the placing of said filter therebetween.

11. A filter holder for attachment to a projection apparatus having a projection lens, said holder having a portion thereof adapted to be moved laterally into and out of the light path through said lens and also along the axis of said lens and comprising a pair of overlying flat plate members formed with registering apertures at said portions, shank sections connected to said portions, means for connecting said sections to hold said portions together yieldably and to provide a hinge by which said portions may be separated to permit the placing of a filter therebetween, means on the free ends of said shanks for mounting said holder on said projector for lateral movement into and out of said path and along said axis, means for separating said portions to permit the placing of said filter therebetween, and means on at least one of said portions for positioning said filter between said portions and in registry with said apertures.

12. A filter holder for attachment to a projection apparatus having a projection lens, said holder having a portion thereof adapted to be moved laterally into and out of the light path through said lens and also along the axis of said lens and comprising a pair of overlying flat plate members formed with registering apertures at said portion, shank sections connected to said portion, means for connecting said sections to hold said members together yieldably and to provide a hinge by which said members may be separated to permit the placing of a filter therebetween, means on the free ends of said shanks for mounting said holder on said projector for lateral movement into and out of said path and along said axis, and means for receiving and positioning a mounted filter on the top of said portion.

13. A filter holder for attachment to a projection apparatus having a projection lens, said holder having a portion thereof adapted to be moved laterally into and out of the light path through said lens and also along the axis of said lens and comprising a pair of overlying flat plate members formed with registering apertures at said portion, shank sections connected to said members, means for connecting said sections to hold said members together yieldably and to provide a hinge by which said members may be separated to permit the placing of a filter therebetween, means on the free ends of said shanks for mounting said holder on said projector for lateral movement into and out of said path and along said axis, means for positioning said filter between said members and in registry with said apertures, and means for receiving and positioning a mounted filter on top of said portion and in registry with said apertures.

14. A filter holder for attachment to a projection apparatus having a projection lens, said holder having a portion thereof adapted to be moved laterally into and out of the light path through said lens and also along the axis of said lens and comprising a pair of overlying flat plate members formed with registering apertures at said portion, shank sections connected to said members, means for connecting said sections to hold said members together yieldably and to provide a hinge by which said members may be separated to permit the placing of a filter therebetween, means on the free ends of said shanks for mounting said holder on said projector for lateral movement into and out of said path and along said axis, means for positioning said filter between said members and in registry with said apertures, means for receiving and positioning a mounted filter on top of said portion and in registry with said apertures, and means for moving said members about said hinge to separate said members to permit the placing of said first filter between said members.

15. A filter holder for attachment to a projection apparatus having a projection lens and an abutment, said holder having a portion thereof adapted to be moved laterally into and out of the light path through said lens and also along the axis of said lens and comprising a pair of overlying flat plate members formed with registering apertures at said portion, shank sections connected to said members, means for connecting said sections to hold said members together yieldably and to provide a hinge by which said members may be separated to permit the placing of a filter therebetween, means on the free ends of said shanks for mounting said holder on said projector for lateral movement into and out of said path and along said axis, and a lug on the free end of one of said shanks adapted to engage said abutment when said holder is moved laterally into said light path to arrest said movement to position said holder in said path.

JOHN H. EAGLE.
HOWARD P. CAUDLE.

REFERENCES CITED

The following references are of record in the file of this patent:

UNITED STATES PATENTS

| Number | Name | Date |
|---|---|---|
| 1,116,069 | Jacob | Nov. 3, 1914 |
| 1,613,562 | Frost | Jan. 4, 1927 |
| 1,754,282 | Owens | Apr. 15, 1930 |
| 2,009,145 | Nathan | July 23, 1935 |
| 2,059,361 | Kenworthy | Nov. 3, 1936 |
| 2,248,210 | Worthington et al. | July 8, 1941 |
| 2,255,319 | Kanter | Sept. 9, 1941 |
| 2,294,585 | Thompson | Sept. 1, 1942 |
| 2,399,577 | Simmon et al. | Apr. 30, 1946 |